United States Patent
Hartsuiker et al.

(10) Patent No.: US 9,512,028 B2
(45) Date of Patent: *Dec. 6, 2016

(54) METHOD FOR MANUFACTURING A PRIMARY PREFORM FOR OPTICAL FIBRES

(71) Applicant: Draka Comteq B.V., Amsterdam (NL)

(72) Inventors: Johannes Antoon Hartsuiker, Eindhoven (NL); Igor Milicevic, Helmond (NL); Mattheus Jacobus Nicolaas Van Stralen, Tilburg (NL); Eric Aloysius Kuijpers, Eindhoven (NL)

(73) Assignee: Draka Comteq B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/264,455

(22) Filed: Apr. 29, 2014

(65) Prior Publication Data

US 2014/0230495 A1    Aug. 21, 2014

Related U.S. Application Data

(63) Continuation of application No. 12/845,884, filed on Jul. 29, 2010, now Pat. No. 8,739,575.

(30) Foreign Application Priority Data

Jul. 30, 2009 (NL) .................................... 1037164

(51) Int. Cl.
    *C03B 37/018* (2006.01)

(52) U.S. Cl.
    CPC ..... *C03B 37/01876* (2013.01); *C03B 37/0183* (2013.01); *C03B 37/01815* (2013.01); *C03B 2203/22* (2013.01); *C03B 2203/26* (2013.01); *Y02P 40/57* (2015.11)

(58) Field of Classification Search
    CPC ............. C03B 37/1815; C03B 37/0183; C03B 37/01876; C03B 2203/22; C03B 2203/16
    See application file for complete search history.

(56) References Cited

U.S. PATENT DOCUMENTS

| 4,262,035 A | 4/1981 | Jaeger et al. |
| 4,608,070 A | 8/1986 | Roba |
| 4,659,353 A | 4/1987 | Roba |
| 4,740,225 A | 4/1988 | Cocito et al. |

(Continued)

FOREIGN PATENT DOCUMENTS

JP    2004 036910 A    2/2004

OTHER PUBLICATIONS

European Patent Office Search Report dated Mar. 22, 2010 for Netherlands Patent No. 1037164.

*Primary Examiner* — Queenie Dehghan
(74) *Attorney, Agent, or Firm* — Shumaker, Loop & Kendrick, LLP (57) ABSTRACT

A method for manufacturing a primary preform for optical fibers including surrounding at least part of a hollow substrate tube with a furnace set at a temperature T0, supplying doped or undoped gases to the inside of the tube, creating a reaction zone to promote deposition, and moving the zone back and forth along the length of the tube between to form at least one preform layer, wherein the temperature of the furnace is varied linearly as a function of the thickness of the at least one preform layer to compensate for temperature increases of the tube during deposition.

14 Claims, 2 Drawing Sheets

(56) References Cited

U.S. PATENT DOCUMENTS

| | | |
|---|---|---|
| 4,741,747 A | 5/1988 | Geittner et al. |
| 2002/0083739 A1 | 7/2002 | Pandelisev |
| 2003/0056549 A1 | 3/2003 | de Sandro et al. |
| 2004/0173584 A1 | 9/2004 | Onishi et al. |
| 2005/0144983 A1 | 7/2005 | Nakanishi et al. |
| 2008/0210290 A1* | 9/2008 | Wu et al. ............... 136/244 |
| 2009/0126407 A1 | 5/2009 | Bookbinder et al. |

\* cited by examiner

METHOD FOR MANUFACTURING A PRIMARY PREFORM FOR OPTICAL FIBRES

CROSS-REFERENCE TO RELATED APPLICATION

This Continuation application claims priority from U.S. application Ser. No. 12/845,884 filed Jul. 29, 2010, which claims priority from Dutch Patent App. No. NL1037164 filed Jul. 30, 2009, the entirety of which are incorporated by reference herein.

TECHNICAL FIELD AND BACKGROUND OF THE INVENTION

The present invention relates to a method for manufacturing a primary preform for optical fibres using an internal vapour deposition process, comprising the steps of:

i) providing a hollow glass substrate tube having a supply side and a discharge side, ii) surrounding at least part of the hollow glass substrate tube by a furnace set at a temperature T0, iii) supplying doped or undoped glass-forming gases to the interior of the hollow glass substrate tube via the supply side thereof iv) creating a reaction zone with conditions such that deposition of glass on the inner surface of the hollow glass substrate tube will take place, and v) moving the reaction zone back and forth along the length of the hollow glass substrate tube between a reversal point located near the supply side and a reversal point located near the discharge side of the hollow substrate tube so as to form at least one preform layer on the inner surface of the hollow glass substrate tube, which at least one preform layer comprises several glass layers.

A method as described in the introduction is known per se from U.S. Pat. No. 4,741,747. More in particular, the aforesaid patent discloses a method of fabricating optical preforms according to the PCVD method, wherein glass layers are deposited by moving a plasma back and forth between two points of reversal inside a glass tube whilst adding a reactive gas mixture to the tube at a temperature between 1100° C. and 1300° C. and a pressure between 1 and 30 hPa. The regions of nonconstant deposition geometry at the ends of the optical preform are reduced by moving the plasma nonlinearly with time in the area of at least one reversal point.

U.S. Pat. No. 4,608,070 relates to a method and a device for manufacturing optical preforms wherein a furnace is placed over a rotating substrate tube, wherein the temperature setting of the furnace is a function of r, viz. the radial distance, and x, viz. a longitudinal position along the length of the substrate tube. The temperature function mentioned in said U.S. patent only applies to radial and longitudinal distances and is set at a constant value during the entire deposition process.

U.S. Pat. No. 4,659,353 relates to a method for manufacturing optical fibres, wherein silica layers having a constant thickness but varying dopant percentages are deposited in the interior of a substrate tube, using MCVD technology, in which use is made of a heat source having a circular, asymmetrical temperature profile.

U.S. patent application US 2004/0173584 relates to a method for manufacturing an optical preform, using MCVD technology, wherein the dimension of a plasma flame is controlled as a function of the dimension of the preform.

Japanese publication JP 2004-036910 relates to a quartz burner adapted to effect a wide and uniform high temperature zone at a focal position of the flame by mixing oxyhydrogen gas.

U.S. patent application US 2005/0144983 relates to a method for manufacturing a preform, using CVD technology, wherein the temperature of at least one of the heating element of the furnace and the glass substrate tube is measured, after which the amount of heat generation of the heating element is adjusted based on the measured temperature.

U.S. Pat. No. 4,740,225 relates to a method for manufacturing optical preforms wherein a special temperature profile is set so that core layers are applied to the interior of the substrate tube in a desired thickness.

An optical fibre consists of a core and an outer layer surrounding said core, also referred to as cladding. The core usually has a higher refractive index, so that light can be transported through the optical fibre. The core of an optical fibre may consist of one or more concentric layers, each having a specific thickness and a specific refractive index or a specific refractive index gradient in radial direction.

An optical fibre having a core consisting of one or more concentric layers having a constant refractive index in radial direction is also referred to as a step-index optical fibre. The difference between the refractive index of a concentric layer and the refractive index of the cladding can be expressed in a so-called delta value, indicated $\Delta_i$ % and can be calculated according to the formula below:

$$\Delta_i\% = \frac{n_i^2 - n_{cl}^2}{2n_i^2}$$

where:
$n_i$=refractive index value of layer i
$n_{cl}$=refractive index value of the cladding An optical fibre can also be manufactured in such a manner that a core having a so-called gradient index refractive index profile is obtained. Such a radial refractive index profile is defined both with a delta value $\Delta$ % and with a so-called alpha value $\alpha$. To determine the $\Delta$ % value, use is made of the maximum refractive index in the core. The alpha value can be determined by means of the formula below:

$$n(r) = n_1\left(1 - 2\Delta\%\left(\frac{r}{a}\right)^\alpha\right)^{\frac{1}{2}}$$

where:
$n_i$=refractive index value in the centre of het fibre
a=radius of the gradient index core [μm]
a=alpha value
r=radial position in the fibre [μm]

A representation of the refractive index as a function of the radial position in an optical fibre is referred to as a radial refractive index profile. Likewise it is possible to graphically represent the refractive index difference with the cladding as a function of the radial position in the optical fibre, which can also be regarded as a radial refractive index profile.

The form of the radial refractive index profile, and in particular the thicknesses of the concentric layers and the refractive index or the refractive index gradient in the radial direction of the core determine the optical properties of the optical fibre.

A primary preform comprises one or more preform layers which form the basis for the one or more concentric layers of the core and/or part of the cladding of the optical fibre that can be obtained from a final preform. A preform layer is built up of a number of glass layers.

A final preform as referred to herein is a preform from which an optical fibre is made by using a fibre drawing process.

To obtain a final preform, a primary preform is externally provided with an additional layer of glass, which additional layer of glass comprises the cladding or part of the cladding. Said additional layer of glass can be directly applied to the primary preform. It is also possible to place the primary preform in an already formed glass tube, also referred to as "jacket". Said jacket may be contracted onto the primary preform. Finally, a primary preform may comprise both the core and the cladding of an optical fibre, so that there is no need to apply an additional layer of glass. A primary preform is in that case identical to a final preform. A radial refractive index profile can be measured on a primary preform and/or on a final preform, with the radial refractive index profile of the final preform corresponding to the radial refractive index profile of the optical fibre.

The length and the diameter of the final preform determine the maximum length of optical fibre that can be obtained from the final preform.

To decrease the production costs of optical fibres and/or increase the output per primary preform, the object is to produce, on the basis of a final preform, a maximum length of optical fibre that meets the required quality standards.

Accordingly, there is a desire to increase the amount of additional glass that is applied to a primary preform.

The diameter of a final preform can be increased by applying a thicker layer of additional glass to a primary preform. Because the optical properties of an optical fibre are determined by the radial refractive index profile, the thickness of the layer of additional glass must at all times be in the correct proportion to the layer thickness of the preform layers of the primary preform that will form the core, more in particular the one or more concentric layers of the core in the optical fibre.

Consequently, the layer thickness of the glass layer additionally applied to the primary preform is limited by the thickness of the preform layers being formed by means of the internal vapour deposition process.

In other words, the following criterion must be met:

$$\frac{CSA_{CL,vezel}}{CSA_{i,vezel}} = \frac{CSA_{CL,vv}}{CSA_{i,vv}}$$

where:

$CSA_{CL,fibre}$=Cross-sectional area of the cladding in the fibre $CSA_{CL,vv}$=Cross-sectional area of the cladding in the final preform $CSA_{i,fibre}$=Cross-sectional area of het concentric layer i in the fibre $CSA_{i,vv}$=Cross-sectional area of the preform layer i in the final preform An increase of the diameter of the final preform leads to an increase of the cross-sectional area of the cladding. From the above criterion it follows that the cross-sectional area of the preform layer or layers ($CSA_{i,vv}$) must also be increased. The cross-sectional area of said one or more preform layers must thus be increased during the internal vapour deposition process. This means that, given an unchanged diameter of the hollow glass substrate tube, the thickness of the preform layers being deposited on the inner surface of the hollow glass substrate tube must be increased.

The present inventors have surprisingly found that when relatively thick preform layers for step-index type optical fibres are deposited, the refractive index of a doped preform layer is not sufficiently constant in radial direction. An insufficiently constant radial refractive index adversely affects the optical properties of the optical fibre. In particular factors such as dispersion, cutoff wavelength, bending losses and attenuation may be affected.

The present inventors have also found that when relatively thick preform layers for gradient index type optical fibres are deposited, the alpha value is different from the alpha value being aimed at. A deviating alpha value adversely affects the properties, in particular the bandwidth, of the gradient index optical fibre.

BRIEF SUMMARY OF THE INVENTION

It is an object of the present invention to provide a method for manufacturing a primary preform for step-index type optical fibres wherein the refractive index of a doped preform layer is substantially constant in radial direction.

Another object of the present invention is provide a method for manufacturing a primary preform for gradient index type optical fibres wherein the obtained alpha value is substantially the same as the intended or expected alpha value.

Yet another object of the present invention is provide a method for manufacturing step-index type optical fibres wherein the refractive index of the doped preform layer or preform layers is substantially constant both in radial direction and in longitudinal direction.

The present invention as described in the introduction is characterised in that the furnace temperature is varied relative to T0 during at least part of step v).

Using the above aspect, the radial temperature gradient across the substrate tube is according to the invention influenced in such a manner that a refractive index profile in accordance with the intended refractive index value is obtained for any desired preform layer, which preform layer may comprise several glass layers. In particular in the case of a step-index type preform, the present method will result in a refractive index value of a doped or undoped preform layer which is substantially constant in radial direction.

The present inventors have found that the temperature of the hollow glass substrate tube increases during the internal vapour deposition process in spite of a constant furnace temperature setting. The term "T0" relates to the temperature setting of the furnace before deposition actually commences. In general the furnace temperature T0 is set at a value between 900° C. and 1400° C., preferably between 1100° C. and 1300° C. The variation of the furnace temperature is such that the temperature will not rise above 1400° C. or drop below 900° C.

Without wishing to be bound by this theory, the present inventors assume that this temperature increase can be attributed to the increase of the glass mass on the inner surface of the hollow glass substrate tube.

The present inventors thus assume that the increase of the glass mass is accompanied by an increase of the heat capacity of the hollow glass substrate tube. The result of this is that the relatively high temperature of the reaction zone causes the hollow glass substrate tube to heat up during the internal vapour deposition process.

The temperature of the hollow glass substrate tube is understood to be the temperature of the hollow glass substrate tube, including the already deposited glass layers and/or preform layers.

The present inventors have surprisingly found that the temperature of the hollow glass substrate tube during the deposition process is important as regards the efficiency with which dopants are incorporated in the deposited glass.

More particularly, the present inventors have found that the result of this temperature increase for primary preforms for germanium-doped step-index type optical fibres is that the refractive index in a preform layer exhibits a decrease in radial direction, i.e. in the direction of the centre of the primary preform.

The present inventors have observed a similar effect in the manufacture of primary preforms for gradient index type optical fibres.

More particularly, the decrease of the refractive index in radial direction results in a lower delta value (Δ %) and also a higher alpha value than the delta and alpha values being aimed at.

The decrease of the refractive index or the established higher alpha value is in particular observed when a preform layer is doped with germanium, which is mainly present as germanium oxide in the deposited glass.

Without wishing to be bound by this theory, the present inventors assume that a higher temperature of the hollow glass substrate tube during the internal vapour deposition process causes germanium oxide to evaporate or that the efficiency with which germanium in the form of germanium oxide is incorporated in the glass decreases as a result of the relatively high temperature.

In addition to that, a temperature increase of the hollow glass substrate tube during the deposition process for primary preforms for fluorine-doped step-index type optical fibres may result in an increase of the refractive index in a preform layer in radial direction, i.e. in the direction of the centre of the primary preform. Accordingly, the present method in particular ensures that a compensation, or a correction or adjustment, takes place for the undesirable temperature increase of the hollow glass substrate tube during the deposition process in that the furnace temperature is varied relative to T0 during at least part of step v).

In the embodiment in which a preform layer of a primary preform is doped with germanium as well as with fluorine, an increase as well as a decrease of the refractive index may occur, depending on the concentrations of the two dopants.

It is noted that a decrease of the refractive index in a preform layer in the direction of the centre of the primary preform can be equated with a decrease of the refractive index in a preform layer in the course of time during the deposition process.

The present inventors have found that it possible to influence the gradient of the refractive index of a preform layer in radial direction by varying the temperature of the furnace that surrounds the hollow glass substrate tube relative to T0 during the deposition process. They have also found that it is possible in this way to influence the alpha value in the manufacture of primary preforms for gradient index type optical fibres. In a special embodiment the furnace temperature T0 is preferably set at a value between 900° C. and 1400° C.

Thus, one or more of the above objects are accomplished by carrying out the invention.

In a preferred embodiment, the absolute value of the average temperature variation ranges between 50 and 2000° C./cm, preferably between 150 and 1000° C. The above temperature variation is defined as the variation in temperature in ° C. per centimeter in radial direction in the deposited preform layer.

The height of the temperature variation depends, inter alia, on the concentration and the type of dopant(s). If the temperature variation is selected to be less than +50° C./cm (or more than −50° C./cm), the effect on the refractive index gradient will be small, whilst the exceeding of an upper limit, in particular in the case of relatively thick preform layers, may result in a furnace temperature that entails other process problems. Thus, a temperature variation of more than 2000° C./cm can lead to a temperature of the hollow glass substrate tube at which the viscosity is so low as to result in deformation of the hollow glass substrate tube, for example "sagging". On the other hand, a temperature variation of less than −2000° C./cm can result in a buildup of stresses in radial direction of the glass, which may lead to fracture of the tube.

In another embodiment, the average temperature variation dT/dt in a preform layer is different from the average temperature variation dT/dt in another preform layer adjacent to said preform layer. Consequently, a specific temperature profile can be set for each preform layer, in which connection it is also possible in a special embodiment to maintain a constant furnace temperature for specific preform layers, which constant temperature can be equal to or different from T0. The furnace temperature can thus be varied in such a manner during step v) that dT/dt is subject to variation in time, whilst dT/dt may also amount to zero in a special situation. It may in particular be desirable that dT/dt be constant during the deposition of a preform layer which consists of several glass layers.

The furnace temperature is preferably continuously varied during the deposition process. In this way also the refractive index profile is continuously influenced and consequently the occurrence of stepped changes in the refractive index is minimized. In other words, the term "continuous variation" is understood to mean a gradual variation without any sudden strong increases or decreases.

In another preferred embodiment, the temperature is varied linearly as a function of the thickness of the preform layer in radial direction. It is noted that a linear variation of the temperature may be equated with a linear variation of the temperature as a function of time.

In yet another preferred embodiment, the reaction zone is a plasma, which preferably moves back and forth along the length, in particular the deposition length, of the hollow glass substrate tube, at a velocity ranging between 10 and 40 m/min, preferably between 15 and 25 m/min. The deposition length is to be regarded as the part of the length of the hollow glass substrate tube where glass layers are deposited. In other words, the deposition length is the distance between a reversal point located near the supply side and a reversal point located near the discharge side of the hollow substrate tube, between which reversal points the reaction zone moves back and forth during the deposition process. The two reversal points are surrounded by the furnace.

The refractive index of the deposited glass can be influenced by using dopants. Examples of dopants that increase the refractive index are germanium, phosphorus, titanium and aluminium, or the oxides thereof. Examples of dopants that decrease the refractive index are boron or the oxide thereof and fluorine. Preferably, germanium is used as a refractive index-increasing dopant and fluorine is used as a refractive index-decreasing dopant, with germanium usually being incorporated in the glass as germanium oxide. In a special embodiment, a combination of germanium and fluorine is used as a dopant.

In a special embodiment, the furnace temperature is decreased relative to T0.

In another special embodiment of the method according to the present invention, the furnace comprises at least two adjustable temperature zones, seen in the longitudinal direction of the hollow glass substrate tube, in at least one of which temperature zones the temperature or a temperature gradient is varied relative to T0 during at least part of step v). The term "temperature zone" is to be understood to mean a zone in the longitudinal direction of the hollow glass substrate tube, in which zone the furnace temperature can be regarded as being substantially uniform, or in which a specific temperature gradient in longitudinal direction is created. Such temperature zones are thus arranged in such a manner relative to each other that, in the embodiment comprising two temperature zones, one zone is located on the supply side and the other zone is located on the discharge side, which two zones will preferably make contact with each other at a specified position.

The temperature or the temperature gradient in one zone can preferably be varied independently of the temperature or temperature gradient in the other zone(s).

Using a furnace which thus comprises at least two independently adjustable temperature zones, it is possible to influence not only the refractive index profile in radial direction (radial refractive index profile) but also the refractive index in longitudinal direction (longitudinal refractive index profile). In this connection the term "longitudinal refractive index profile" can be regarded as a graphic representation of the refractive index of a preform layer as a function of the longitudinal position in the primary preform.

Such an embodiment is in particular suitable for manufacturing primary preforms for gradient index type optical fibres, because it is possible in that case to reduce any deviations of the alpha value from a desired value along the length of the primary preform.

In one embodiment, the furnace temperature, or the temperature or the temperature gradient in at least one temperature zone, is varied relative to T0 in at least one temperature zone during the formation of at least one preform layer.

In a special embodiment; the furnace temperature, or the temperature or the temperature gradient in at least one of its temperature zones, is varied relative to T0 during the formation of a preform layer having a thickness of at least 0.5 mm, preferably at least 1 mm, seen in radial direction. In a PCVD process such thicknesses correspond to the deposition of about 500 and 1000 layers, respectively. It should be noted that a different number of layers may be deposited, since the layer thickness depends in particular on the speed with which the reaction zone is moved along the deposition length. Thus, a higher speed of the reaction zone will lead to a smaller thickness of glass layer, which means that more glass layers are needed for each preform layer in order to realise a specific thickness of the preform layer.

BRIEF DESCRIPTION OF THE FIGURES

The present invention will now be explained in more detail by means of an example with reference to a number of figures, in which connection it should be noted, however, that the present invention is by no means limited thereto.

DETAILED DESCRIPTION OF THE INVENTION

Figure 1:
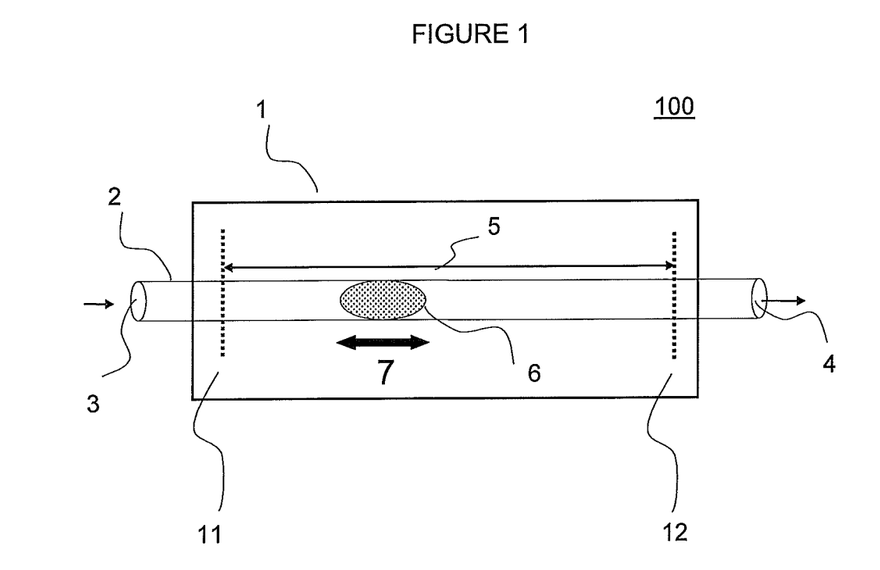
FIG. 1 is a schematic view of a device for carrying out an internal deposition process.

In FIG. 1, a device 100 for carrying out an internal vapour deposition process for the manufacture of a primary preform for optical fibres is schematically shown. The device 100 comprises a furnace 1, which surrounds at least the deposition length 5 of a hollow glass substrate tube 2.

The deposition length 5 corresponds to the part of the length of the hollow glass substrate tube 2 where glass layers are deposited. In other words, the deposition length 5 corresponds to the distance between the reversal point 11 located near the supply side and the reversal point 12 located near the discharge side of the hollow glass substrate tube. The deposition length 5 is surrounded by the furnace 1. The term "reversal point" is to be understood as a position in the longitudinal direction of the hollow glass substrate tube 2 where the direction of movement of the reaction zone 6 is reversed in the opposite direction. The two reversal points 11, 12 are enclosed by the furnace 1.

The hollow glass substrate tube 2 has a supply side 3 and a discharge side 4. The supply side 3 and the discharge side 4 can be positioned between a gas inlet and a gas outlet, respectively (not shown). The supply side 3 and the discharge side 4 may be clamped down thereon via a cylindrical passage provided with an O-ring seal, so that the internal volume of the hollow glass substrate tube 2 is isolated from the outside atmosphere. Such a construction makes it possible to carry out the deposition process at a reduced pressure when a pump (not shown) is connected to the gas outlet.

The aforesaid cylindrical passage may also be used in a rotary embodiment, so that the substrate tube can be rotated continuously or in steps during the deposition process.

During the vapour deposition process a reaction zone 6 moves back and forth along the length of the hollow glass substrate tube 2 between the reversal point 11 near the supply side 3 and the reversal point 12 near the discharge side 4, which length is also referred to as the deposition length 5, inside the hollow glass substrate tube 2 so as to form glass layers. The width 7 of the reaction zone 6 is smaller than the deposition length 5. The present invention is in particular suitable for use in a PCVD-type deposition process, in which the reaction zone is a low-pressure plasma. The term "low pressure" is understood to mean that the plasma is created at a pressure of about 1-20 mbar in the substrate tube.

While glass-forming gases, which may or may not be doped, are being supplied to the supply side 3 of the hollow glass substrate tube 2, glass layers (not shown) are deposited along the deposition length 5 on the inner surface of the hollow glass substrate tube 2.

A number of glass layers deposited using a more or less constant composition of the glass-forming gases being supplied on the supply side 3 thus form a preform layer.

It is also possible to form a preform layer by using a predetermined variation in the composition of the glass-forming gases. Such a preform layer is for example used for manufacturing a primary preform for gradient index type optical fibres.

After completion of the deposition process, the substrate tube 2 with the preform layer/layers deposited therein can be consolidated into a solid rod by means of a contraction process, also referred to as a collapse process.

Means for creating a reaction zone inside the hollow glass substrate tube 2 preferably comprise a resonator, as known for example from the U.S. patent applications published under Nos. US 2007/0289532, US 2003/159781 and US 2005/0172902. U.S. Pat. No. 4,844,007, U.S. Pat. No. 4,714,589, U.S. Pat. No. 4,877,938. Such resonators enclose the substrate tube 2 and are moved back and forth along the deposition length during the deposition process.

Figure 2:
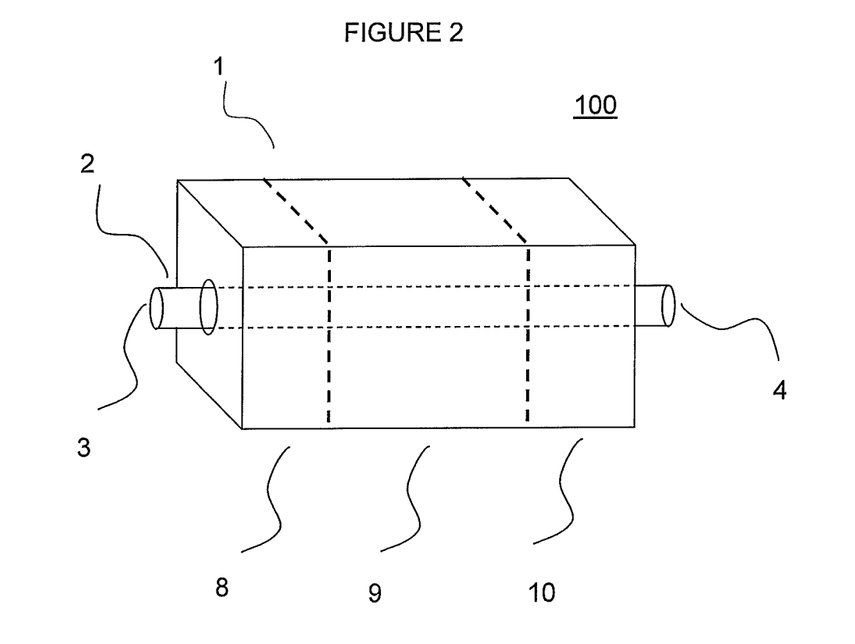
FIG. 2 is a schematic, perspective view of a device for carrying out an internal deposition process according to a preferred embodiment of the present invention.

FIG. 2 is a perspective view of a special embodiment of the device 100, in which three temperature zones 8, 9 and 10 are schematically shown. The temperature zones 8, 9 and 10 can for example be created by disposing individually controllable heating elements (not shown) in the furnace 1 at various positions in the longitudinal direction of the substrate tube. Carbon elements, for example, are suitable heating elements. The present invention is not limited to carbon elements, however. In principle, heating elements capable of reaching a maximum temperature of about 1400° C. are suitable. The width of the temperature zones can be set as needed and is not necessarily the same for each temperature zone. To achieve a precise setting of the temperature of the substrate tube in longitudinal direction, it may be advantageous to realise temperature zones having mutually different lengths.

The temperature zones 8, 9, 10 may be separated from each other by one or more separating elements (not shown) made of an insulating material, for example aluminium oxide. The use of insulating separating elements makes it possible the maintain a constant temperature of the substrate tube 2 in a temperature zone. The absence of insulating separating elements will possibly lead to variations in the temperature of the substrate tube 2, in particular near the transition(s) between the adjacent temperature zone(s). Although FIG. 2 shows a furnace 1 comprising three temperature zones 8, 9 and 10, the present invention is by no means limited to such an embodiment.

The variation of the temperature of the furnace 1, or of a temperature zone 8, 9, 10, can for example be effected by controlling the temperature of the furnace or of the temperature zones 8, 9, 10, respectively, using a suitable control system based on a calculating unit, such as a computer or a PLC (Programmable Logic Controller).

Figure 3:
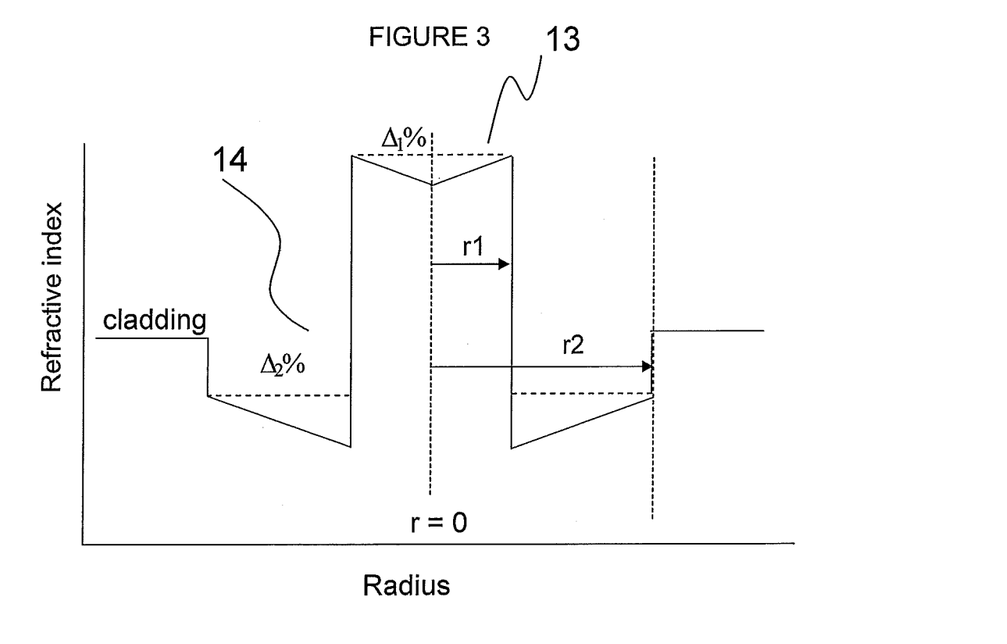
FIG. 3 is a schematic view of a radial refractive index profile of the step-index type that can be realised by means of a method according to the prior art.

An example of a radial refractive index profile of a primary preform for a step-index optical fibre is shown in FIG. 3 (not to scale). The radius is shown on the horizontal axis and the refractive index (or the delta value) is shown on the vertical axis, with the centre of the primary preform being indicated r=0 in FIG. 3. From the centre of the primary preform, the core is formed by two preform layers 13 and 14. The preform layer 13 has a radius r1 and a refractive index difference with the cladding of $\Delta_1\%$. The preform layer 14 has a radius r2 and a refractive index difference with the cladding of $\Delta_2\%$. The two preform layers 13 and 14 can for example be formed on the basis of silica glass doped with germanium, present in the glass as germanium oxide, and fluorine. The cladding surrounds the core.

The full lines descending in the direction of the centre of the primary preform (not according to the invention) in the preform layers 13 and 14 correspond to a gradient of the refractive index that can be obtained by using a method according to the prior art, whilst the broken lines show the desired refractive index. The obtained refractive index thus deviates from the desired value in the direction of the centre of the primary preform.

Figure 4:
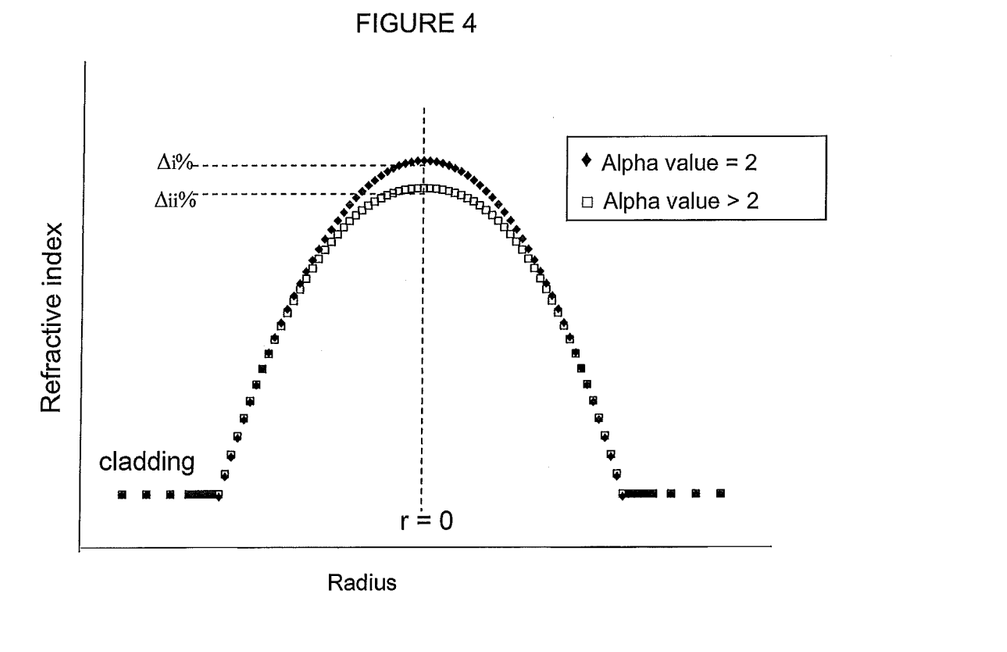
FIG. 4 is a view of two radial refractive index profiles of the gradient index type.

FIG. 4 schematically shows two radial refractive index profiles of a primary preform for gradient index type optical fibres. The radius is shown on the horizontal axis and the refractive index (or the delta value) is shown on the vertical axis, with the centre of the optical fibre being indicated r=0 in this figure. If a method according to the prior art is used, with an alpha value=2 and a specified delta value $\Delta_i$ % being aimed at, a primary preform having a radial refractive index profile with an alpha value >2 and a lower delta value $\Delta_{ii}$ % will be obtained (exaggerated in the figure).

EXAMPLE

Two primary preforms PV1 and PV2 for step-index type optical fibres having a desired radial refractive index profile for the preform layers 13 and 14 according to the broken lines in FIG. 3 were manufactured using a PCVD process. To that end, a hollow glass substrate tube was provided between a supply side and a discharge side of a PCVD device, whereupon the aforesaid hollow glass substrate tube was surrounded by a furnace set at a temperature T0=1040° C. The furnace used in this example has only one temperature zone. It is also possible, however, to use a furnace in which the furnace comprises at least two adjustable temperature zones, wherein the temperature or a temperature gradient is varied relative to T0 in at least one of the temperature zones during at least part of step v), in which connection the term "temperature zone" is to be understood to mean a zone in the longitudinal direction of the hollow glass substrate tube. Subsequently, the internal plasma-chemical vapour deposition process was carried out while doped or and undoped glass-forming gases were being supplied.

To form a first preform layer, an undoped glass-forming gas, viz. a mixture of $SiCl_4$ and $O_2$, was supplied to the interior of the hollow glass substrate tube.

To form the second and the third preform layer, indicated at 14 and 13, respectively, in FIG. 3, germanium in the form of germanium tetrachloride ($GeCl_4$) and fluorine in the form of hexafluoroethane ($C_2F_6$) were used as dopants in addition to $SiCl_4$ and $O_2$. Using mutually different amounts of the dopants, it is possible to obtain two mutually different values for the refractive index, expressed in the refractive index difference $\Delta_2\%$ and $\Delta 1\%$, respectively.

The furnace temperature was varied relative to T0 during the deposition of the preform layers, viz. the present step v), as is shown in the table below.

The first preform layer consists of 600 glass layers and has a thickness in radial direction of about 0.49 mm after completion of the vapour deposition process.

The furnace temperature was maintained at T0 for both primary preforms PV1 and PV2 during the deposition of the first preform layer.

The second preform layer consists of 4870 glass layers for both primary preforms PV1 and PV2 and has a thickness in radial direction of about 4.4 mm after completion of the vapour deposition process.

The furnace temperature was maintained at a constant value T0 during the deposition of the second preform layer for PV1.

The furnace temperature was decreased linearly in time from 1040° C. to 980° C. during the deposition of the second preform layer for PV2. The average value of the temperature variation thus amounted to about −136° C./cm.

The third preform layer, which is adjacent to the second preform layer, consists of 920 glass layers for both primary preforms PV1 and PV2 and has a thickness in radial direction of about 0.75 mm after completion of the vapour deposition process.

The furnace temperature was maintained at a constant value T0 during the deposition of the third preform layer for PV1. The furnace temperature was decreased linearly in time from 980° C. to 950° C. during the deposition of the third preform layer for PV2. The average value of the temperature variation thus amounted to about −400° C./cm.

TABLE

|  | 1st preform layer | | 2nd preform layer | | 3rd preform layer | |
| --- | --- | --- | --- | --- | --- | --- |
|  | T(beginning) [° C.] | T(end) [° C.] | T(beginning) [° C.] | T(end) [° C.] | T(beginning) [° C.] | T(end) [° C.] |
| PV1 | 1040 | 1040 | 1040 | 1040 | 1040 | 1040 |
| PV2 | 1040 | 1040 | 1040 | 980 | 980 | 950 |

The hollow glass substrate tubes obtained after completion of the various internal vapour deposition processes for PV1 and PV2 were both consolidated in two (solid) primary preforms by means of a collapsing process. Subsequently, a radial refractive index profile of each of the two primary preforms PV1 and PV2 was measured using a preform analyzer, for example a "2600 Preform Analyser" commercially available from Photon Kinetics.

The refractive index of the first (undoped) preform layer was constant in the radial direction both in PV1 and in PV2, which can be accounted for by the absence of dopants.

The refractive index of the second and the third preform layer of PV1 was not constant in the radial direction, but exhibited a decrease in the direction of the radial center of the primary preform as indicated by the full lines in the schematic representation of FIG. 3.

The refractive index of the preform layers of PV2 was substantially constant in the radial direction for the two preform layers as indicated by the broken lines in the schematic representation of FIG. 3.

Although the present invention has been explained for a primary preform for optical fibres comprising three preform layers, i.e., a first undoped preform layer and two doped preform layers, each having a specific thickness in radial direction and/or containing specific amounts of dopants, the present invention is not limited to such a particular embodiment. The present invention applies to primary preforms both for step-index type optical fibres and for gradient index type optical fibres comprising at least one doped preform layer.

What is claimed is:
1. A method for manufacturing a primary preform for optical fibres using an internal vapour deposition process, comprising the steps of:
   i) providing a hollow glass substrate tube having a supply side and a discharge side;
   ii) surrounding at least part of the hollow substrate tube with a furnace set at a temperature T0,
   iii) supplying doped or undoped glass-forming gases to the interior of the hollow glass substrate tube via the supply side;
   iv) creating a reaction zone with conditions such that deposition of glass on the inner surface of the hollow glass substrate tube takes place; and
   v) moving the reaction zone back and forth along the length of the hollow glass substrate tube between a reversal point located near the supply side and a reversal point located near the discharge side to form a first preform layer on the inner surface of the hollow glass substrate tube, the first preform layer comprising several glass layers; and
   vi) depositing at least a second preform layer comprising several glass layers on the first preform layer of step v) to form radially adjacent preform layers; wherein:
   a refractive index layer profile is generated between radially adjacent preform layers by varying temperature of the furnace surrounding the hollow glass substrate tube linearly as a function of preform layer thickness in the radial direction during at least part of step v) and/or step vi) during the deposition process and adding a refractive index altering material selected from the group consisting of a refractive index-increasing dopant, refractive index-decreasing dopant, or a combination thereof thereby increasing doping efficiency while compensating for temperature increase of the hollow glass substrate tube during deposition to obtain a constant refractive index in at least one preform layer in a radial direction when generating the refractive index layer profile between the radially adjacent preform layers.

2. The method according to claim 1, wherein the absolute value of the average temperature variation ranges between 50 and 2000° C./cm during at least part of step v), wherein temperature variation is defined as the variation in temperature in ° C. per centimeter of preform layer deposited in the radial direction.

3. The method according to claim 1, wherein the absolute value of the average temperature variation ranges between 150 and 1000° C./cm during at least part of step v), wherein temperature variation is defined as the variation in temperature in ° C. per centimeter of preform layer deposited in the radial direction.

4. The method according to claim 1, wherein the reaction zone in step v) is a plasma.

5. The method according to claim 4, wherein in step v) the reaction zone moves back and forth at a velocity ranging between 10 and 40 m/min along the deposition length of the hollow glass substrate tube, wherein deposition length is the distance between the reversal point located near the supply side and the reversal point located near the discharge side of the hollow glass substrate tube.

6. The method according to claim 5, wherein in step v) the reaction zone moves back and forth at a velocity ranging between 15 and 25 m/m in along the deposition length of the hollow glass substrate tube, wherein deposition length is the distance between the reversal point located near the supply side and the reversal point located near the discharge side of the hollow glass substrate tube.

7. The method according to claim 1, wherein the furnace temperature is decreased relative to T0 during at least part of step v).

8. The method according to claim 1, wherein the furnace comprises at least two adjustable temperature zones along the longitudinal direction of the hollow glass substrate tube, wherein the temperature is varied relative to T0 during at least part of step v) in at least one of the at least two adjustable temperature zones.

9. The method according to claim 8, wherein the temperature in one adjustable temperature zone is varied independently of a temperature or temperature gradient in another adjustable temperature zone.

10. The method according to claim 1, wherein the temperature of the furnace is varied relative to T0 during the formation of the first preform layer in step v).

11. The method according to claim 1, wherein the temperature of the furnace in step v) is varied relative to T0 during the formation of the at least one preform layer having a thickness of at least 0.5 mm, viewed in a radial direction.

12. The method according to claim 1, wherein the temperature of the furnace in step v) is varied relative to T0 during the formation of the at least one layer having a thickness of at least 1 mm, viewed in a radial direction.

13. The method according to claim 1, wherein the furnace surrounds at least the deposition length of the hollow glass substrate tube corresponding to the distance between the reversal point located near the supply side and the reversal point located near the discharge side of the hollow substrate tube.

14. The method according to claim 1, wherein the furnace temperature T0 is between 900° C. and 1400° C., and wherein the variation of the furnace temperature is such that the temperature does not rise above 1400° C. or drop below 900° C. in step v).

* * * * *